United States Patent [19]

Schultz et al.

[11] Patent Number: 4,960,009
[45] Date of Patent: Oct. 2, 1990

[54] NOISE AND VIBRATION DAMPER FOR A TRANSMISSION SHIFT LEVER

[75] Inventors: Donald C. Schultz; James G. Koedam, both of Toledo, Ohio

[73] Assignee: Dana Corporation, Toledo, Ohio

[21] Appl. No.: 412,632

[22] Filed: Sep. 25, 1989

Related U.S. Application Data

[63] Continuation-in-part of Ser. No. 201,508, Jun. 2, 1988, abandoned.

[51] Int. Cl.$^5$ .............................................. G05G 9/12
[52] U.S. Cl. .................................. 74/473 R; 74/523; 403/224; 403/305; 403/306
[58] Field of Search ............ 74/519, 523, 524, 47 BR; 403/220–228, 305, 306; 464/153, 89

[56] References Cited

U.S. PATENT DOCUMENTS

| | | | |
|---|---|---|---|
| 777,215 | 12/1904 | Meston | 403/306 |
| 1,927,646 | 9/1933 | Miller | 74/473 P |
| 2,272,900 | 2/1942 | Saurer | 403/228 |
| 3,315,537 | 4/1967 | Keller | 74/519 |
| 3,350,957 | 11/1967 | Morse . | |
| 3,406,586 | 10/1968 | Hobbins . | |
| 3,657,943 | 4/1972 | Bruhn, Jr. et al. . | |
| 3,693,467 | 9/1972 | Oehl . | |
| 3,800,909 | 4/1974 | Duncanson et al. . | |
| 4,092,078 | 5/1978 | Klotz et al. . | |
| 4,189,249 | 2/1980 | Gaines | 403/305 |
| 4,466,306 | 8/1984 | Katayma . | |
| 4,492,129 | 1/1985 | Hasegawa . | |
| 4,569,246 | 2/1986 | Katayama et al. . | |
| 4,603,598 | 8/1986 | Tsuji | 74/523 |
| 4,636,106 | 1/1987 | Waisbrod . | |
| 4,646,585 | 3/1987 | Strohmeyer et al. . | |

FOREIGN PATENT DOCUMENTS

| | | | |
|---|---|---|---|
| 2362504 | 12/1973 | Fed. Rep. of Germany . | |
| 2406131 | 2/1974 | Fed. Rep. of Germany . | |
| 3231407 | 3/1983 | Fed. Rep. of Germany . | |
| 1311931 | 10/1961 | France | 403/305 |
| 266724 | 12/1947 | Switzerland | 403/225 |
| 1441212 | 6/1976 | United Kingdom . | |
| 1454671 | 11/1976 | United Kingdom . | |
| 1454672 | 11/1976 | United Kingdom . | |

*Primary Examiner*—Gary L. Smith
*Assistant Examiner*—Flemming Saether
*Attorney, Agent, or Firm*—MacMillan, Sobanski & Todd

[57] ABSTRACT

A noise and vibration damper for a shift lever assembly in a manually operable vehicle transmission is disclosed. The damper includes a hollow cylindrical housing having upper and lower pairs of aligned, transversely extending apertures. The upper end of a lower shift lever member extends upwardly into housing, while the lower end of an upper shift lever member extends downwardly into the housing. A transversely extending pin extends through apertures formed in the ends of each of the shift lever members and through their respective pair of apertures to secure the shift lever members to the housing. The ends of the pins are supported within the apertures by nylon bushings. The ends of the upper and lower shift lever members are spaced apart from one another and from the damper housing by a hollow cylindrical sleeve of vibration dampening material, such as polyurethane. The polyurethane is injected into the housing and molded about the ends of the shift lever members so as to acoustically isolate them from one another. A collar is provided about both the upper and lower ends of the damper housing to provide positive stops for the shift lever members when they are moved.

22 Claims, 2 Drawing Sheets

NOISE AND VIBRATION DAMPER FOR A TRANSMISSION SHIFT LEVER

CROSS REFERENCE TO RELATED APPLICATION

This application is a continuation-in-part of Ser. No. 07/201,508, filed June 2, 1988, now abandoned.

BACKGROUND OF THE INVENTION

The present invention relates generally to shift levers for effecting gear changing operations in manually operable vehicle transmissions. In particular, the present invention relates to a noise and vibration damper for such a shift lever.

In most vehicles, a transmission is provided in the drive train between the engine and the driven wheels. As is well known, the transmission includes a plurality of gears which are selectively engaged to provide a plurality of speed reduction gear ratios between the input and the output of the transmission. A control member within the transmission is moved by a driver of the vehicle throughout a plurality of gear ratio positions for selecting the desired speed reduction As a result, acceleration and deceleration of the vehicle can be achieved in a smooth and efficient manner.

In many smaller vehicles, such as automobiles, the transmission functions automatically. In other words, the shifting of the control member between the various gear ratio positions in the transmission is accomplished automatically by a control system without any intervention by the driver of the vehicle. However, an automatic transmission is not used in many larger vehicles, such as trucks, because of the increased size and expense Such larger vehicles are, therefore, often provided with a manually operable transmission, one in which the shifting of the control member between the various gear ratio positions is accomplished by physical movement of the vehicle driver.

In order to shift the control member between the gear ratio positions in a manual transmission, a mechanical shift lever assembly is generally provided. A lower end of the shift lever assembly extends downwardly within the transmission into engagement with the control member, while the other end extends upwardly into an area which is convenient for the vehicle driver to grasp and manipulate it. Thus, when the upper end of the shift lever assembly is moved by the vehicle driver, the lower end is also moved within the transmission. By properly moving the upper end of the shift lever assembly, the vehicle driver may position the control member of the transmission to select any one of the plurality of gear ratios for use.

When the vehicle is operated, it has been found that the transmission and other components of the drive train of the vehicle vibrate to a certain extent. Also, vibrations are generated by the vehicle engine itself during operation. All of such vibrations can be sensed as undesirable noise by the vehicle driver. To reduce the amount of this vibratory noise sensed by the driver, the compartment of the vehicle in which the vehicle driver is located is typically lined with acoustical insulating material. Unfortunately, the shift lever assembly must extend upwardly from the transmission into such driver compartment for convenient use. As a result, the shift lever assembly transmits these vibrations into the driver compartment, thereby defeating the acoustical insulation. Thus, it would be desirable to provide the shift lever assembly with a vibration and noise dampening mechanism which reduces or prevents the vibrations of the engine and the transmission from being transmitted by the shift lever assembly into the driver compartment of the vehicle.

SUMMARY OF THE INVENTION

The present invention relates to a noise and vibration damper for a shift lever assembly in a manually operable vehicle transmission. A lower shift lever member is connected to the transmission for effecting gear changing operations. The upper end of the lower shift lever member extends upwardly from the transmission and is adapted to be connected to the lower end of an upper shift lever member by means of the noise and vibration damper. The damper includes a hollow cylindrical housing having upper and lower pairs of aligned, transversely extending apertures formed therethrough. The upper end of the lower shift lever member extends upwardly into the lower end of the damper housing past the lower pair of apertures, while the lower end of the upper shift lever member extends downwardly into the upper end of the damper housing past the upper pair of apertures. A transversely extending pin extends through apertures formed in the ends of each of the upper and lower shift lever members and through their respective pair of apertures to secure the shift lever members to the housing. The ends of the pins are supported within the apertures by nylon bushings. The ends of the upper and lower shift lever members are spaced apart from one another and from the damper housing by a hollow cylindrical sleeve of vibration dampening material, such as polyurethane. The polyurethane is injected into the housing and molded about the ends of the shift lever members so as to acoustically isolate them from one another. A collar is provided about both the upper and lower ends of the damper housing to provide positive stops for the shift lever members when they are moved.

It is an object of the present invention to provide an improved noise and vibration damper for a shift lever assembly in a manually operable vehicle transmission.

It is another object of the present invention to provide such a damper in which a lower vibrating member is acoustically isolated from an upper non-vibrating member by injection molded polyurethane.

It is a further object of the present invention to provide such a damper which is simple and inexpensive in construction.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
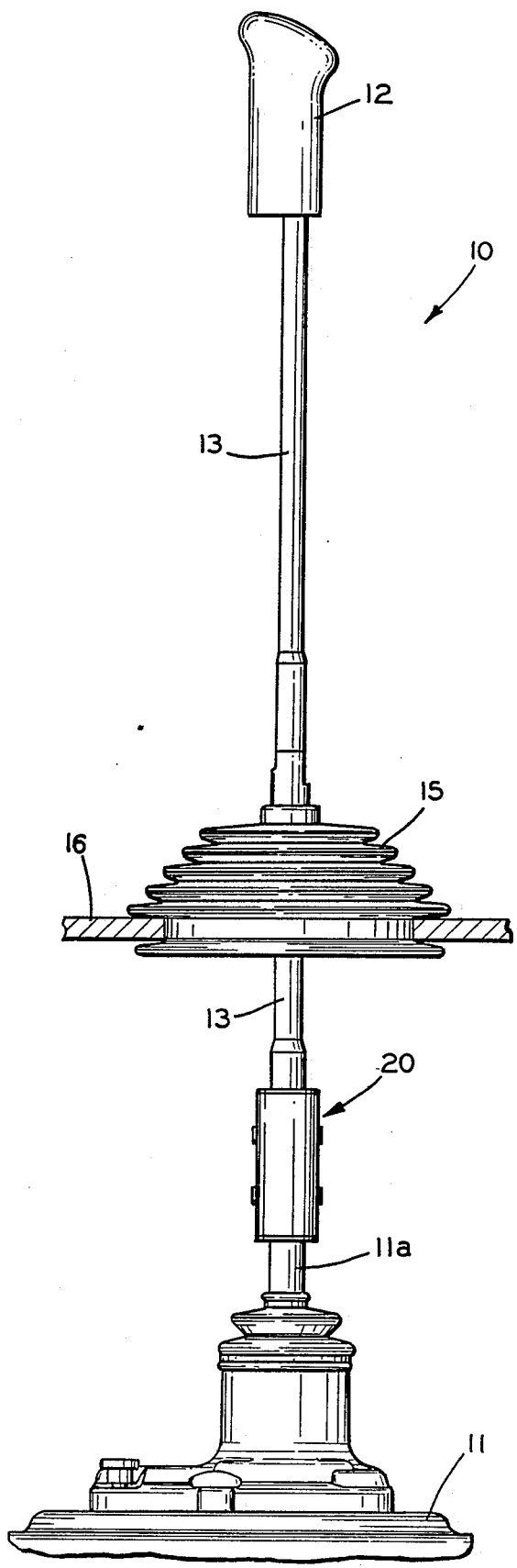
FIG. 1 is an elevational view of a transmission shift lever assembly in accordance with the present invention.

Referring now to the drawings, there is illustrated in FIG. 1 a shift lever assembly, indicated generally at 10, in accordance with the present invention. The shift lever assembly 10 is connected for use with a conventional manually operable vehicle transmission 11. As is well known in the art, the transmission 11 includes a plurality of gears (not shown) which are selectively engaged to provide a plurality of speed reduction gear ratios between the input and the output of the transmission 11. A control member (not shown) within the transmission 11 is moved by a driver of the vehicle throughout a plurality of gear ratio positions for selecting the desired speed reduction. A lower shift lever member 11a is connected to the control member of the transmission 11 for moving such control member between the various gear ratio positions. Thus, by moving the lower shift lever member 11a, the transmission 11 can be operated to provide a desired gear ratio between the input and output thereof. As will be explained in greater detail below, the shift lever assembly 10 is provided to permit a driver of the vehicle to easily move the lower shift lever member 11a.

The shift lever assembly 10 includes a handle 12 mounted on the upper end of an elongated upper shift lever member 13. The handle 12 is sized to be easily grasped by the driver of the vehicle. The upper shift lever member 13 extends downwardly from the handle 12 through a flexible elastomeric boot 15 mounted in a relatively large diameter hole formed through a floor, schematically illustrated at 16. The floor 16 can function as a divider between the driver compartment of the vehicle (above the floor 16) and the engine and drive train compartment (below the floor 16). If desired, appropriate acoustical insulating material (not shown) may be incorporated into the floor 16 to reduce the amount of undesirable noise rising from the engine compartment and entering the driver compartment.

Beneath the floor 16, the upper shift lever member 13 extends further downwardly into engagement with a noise and vibration damper, indicated generally at 20. Similarly, the upper end of the lower shift lever member 11a extends into engagement with the damper 20 as well. As shown in the drawings, the lower end of the upper shift lever member 13 is received within the upper end of the damper 20, while the upper end of the lower shift lever member 11a is received within the lower end of the damper 20. The structure and operation of the damper 20 is explained in detail below.

Figure 2:
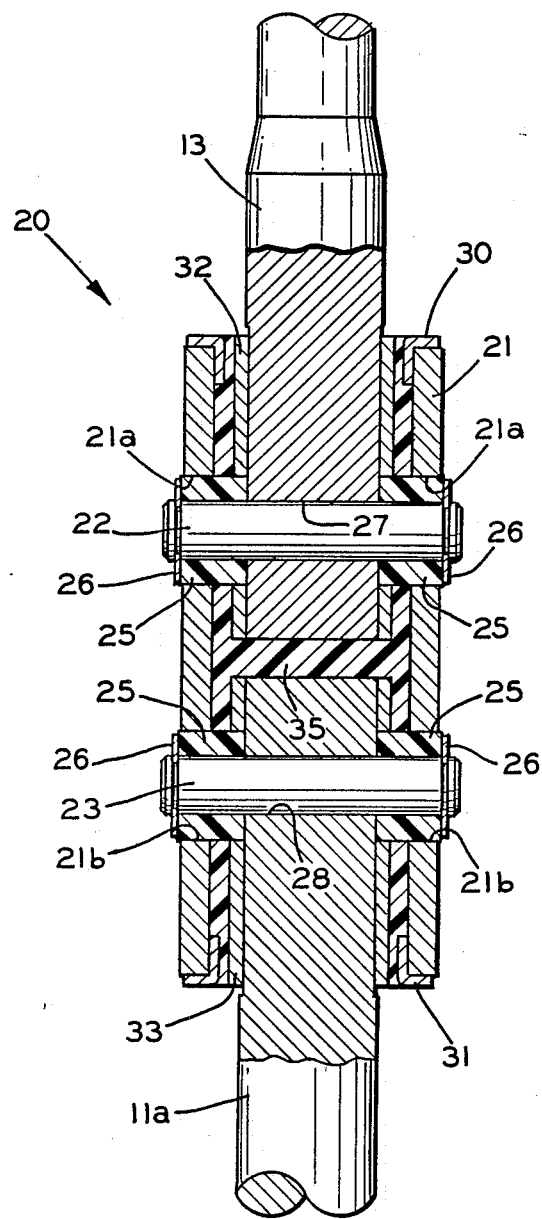
FIG. 2 is an enlarged sectional elevational view of the noise and vibration damper illustrated in FIG. 1.

Referring now to FIG. 2, it can be seen that the damper 20 includes an outer metallic cylindrical housing 21 having a pair of upper apertures 21a and a pair of lower apertures 21b formed therethrough. The upper apertures 21a are oriented in opposed fashion on the housing 21 so as to define a common axis therethrough, which is transverse relative to the housing 21. The lower apertures 21b are similarly oriented. Upper and lower metallic pins 22 and 23 extend through the respective upper and lower apertures 21a and 21b. The ends of the pins 22 and 23 are supported within the respective apertures 21a and 21b by bushings 25. The bushings 25 are formed from a rigid, low friction material, such as nylon. A snap ring 26 is disposed in a circumferential groove formed near each end of both of the pins 22 and 23 to retain the bushings 25 thereon.

As mentioned above, the lower end of the upper shift lever member 13 is received within the upper end of the housing 21. An aperture 27 is formed through the lower end of the upper shift lever member 13, which is adapted to be aligned with the upper apertures 21a. When so aligned, the upper pin 22 extends through such apertures 27 and 21a to retain the lower end of the upper shift lever member 13 within the housing 21. Similarly, an aperture 28 is formed through the upper end of the lower shift lever member 11a. The aperture 28 is adapted to be aligned with the lower apertures 21b to permit the lower pin 23 to extend therethrough to retain the upper end of the lower shift lever member 11a within the housing 21. The bushings 25 are sized such that they abut the outer circumferential surfaces of the upper and lower shift lever members 13 and 11a, respectively, when installed as shown. As a result, the upper and lower shift lever members 13 and 11a, respectively, are reliably secured to the housing 21 so as to prevent them from being withdrawn therefrom without first detaching the snap rings 26 and removing the pins 22 and 23.

Upper and lower annular metallic collars 30 and 31 are respectively secured to the upper and lower open ends of the housing 21. Each of the collars 30 and 31 is generally L-shaped in cross section, having a first portion extending axially along the inner circumferential surface of the housing 21 and a second portion extending over the adjacent end of the housing 21. Within the upper and lower collars 30 and 31 and within the housing 21, upper and lower hollow cylindrical metallic liners 32 and 33 are provided. The upper liner 32 extends co-axially downwardly from the upper collar 30 within the housing 21, while the lower liner 33 extends co-axially upwardly from the lower collar 31 within the housing 21.

The upper and lower liners 32 and 33 are located concentrically within and are spaced apart from the housing 21 and the collars 30 and 31. Thus, annular radially extending spaces are defined between the outer circumferential surfaces of both the upper and lower liners 32 and 33 and the inner circumferential surfaces of the housing 21 and the collars 30 and 31. The size of each radial space is somewhat reduced at the upper and lower ends of the housing 21 because the axially extending portions of the collars 30 and 31 define inner circumferential surfaces which are smaller in diameter than the housing 21. The upper and lower liners 32 and 33 do not abut or engage one another, but rather are spaced apart to define a disc-shaped axially extending space therebetween.

A noise and vibration dampening material 35 is disposed within the radially and axially extending spaces described above. The material 35 fills the radially extending spaces defined between the liners 32 and 33 and the housing 21 and between the liners 32 and 33 and the collars 30 and 31. The material 35 also fills the axially extending space defined between the liners 32 and 33. In this embodiment, the material 35 consists of polyurethane. The material 35 may be provided within the housing 21 as shown by conventional injection molding techniques, wherein the material 35 is forced under pressure through an injection aperture (not shown) formed through the housing 21 when the other components of the damper 20 are assembled and maintained as shown. During the injection process, the upper and lower shift lever members 13 and 11a themselves or conventional plugs may be used to prevent the material 35 from entering within the liners 32 and 33.

When the vibration dampening material 35 is injected into the damper 20, it securely adheres the liners 32 and 33 to the housing 21. The upper and lower shift lever members 13 and 11a may then be inserted within the respective upper and lower liners 32 and 33 and retained therein by the pins 27 and 28. The outer diameters of the shift lever members 13 and 11a are only slightly smaller than the inner diameters of the respective liners 32 and 33, thereby providing a good slip fit therein without play. Once inserted within the liners 32 and 33, the shift lever members 13 and 11a are secured to the housing 21 by the pins 22 and 23 as described above.

The damper 20 is effective in greatly reducing the amount of vibration transmitted from the lower shift lever member 11a to the upper shift lever member 13 and, therefore, the amount of noise transmitted into the driver compartment of the vehicle. This occurs because the upper shift lever member 13 is acoustically isolated from the vibrating lower shift lever member 11a. Such acoustical isolation is primarily provided by the vibration dampening material 35, which absorbs most of such vibration. The nylon bushings 35 isolate the pins 27 and 28 from the housing 21 to further reduce the amount of transmitted vibration.

Despite the fact that the damper 20 accomplishes this reduction in transmitted vibration, the shift lever assembly 10 of the present invention retains a firm "feel" during use. In other words, the upper shift lever member 13 is not greatly angled or tilted relative to the lower shift lever member 11a when it is grasped and moved by the driver of the vehicle. The upper and lower collars 30 and 31 function as positive stops when such angling or tilting occurs, since they define inner diameters which are smaller than the inner diameter of the housing 21.

Figure 3:
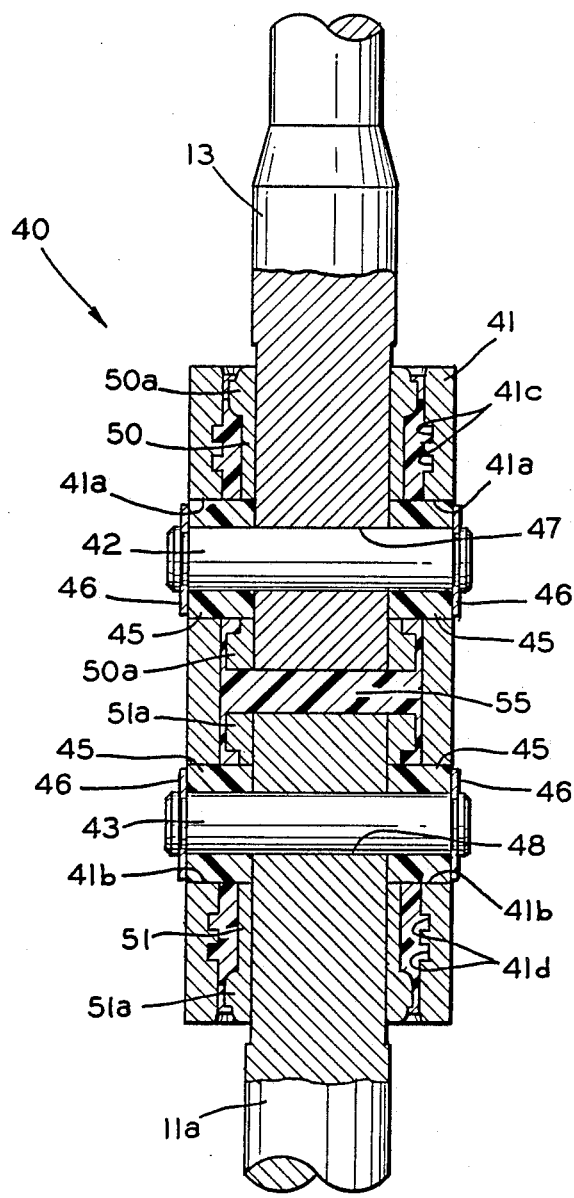
FIG. 3 is an enlarged sectional elevation view, similar to FIG. 2, showing an alternate embodiment of the noise and vibration damper illustrated in FIG. 1.

Referring now to FIG. 3, an alternate structure for a damper 40 illustrated. The damper 40 includes an outer metallic cylindrical housing 41 having a pair of upper apertures 41a and a pair of lower apertures 41b formed therethrough. The upper apertures 41a are oriented in opposed fashion on the housing 41 so as to define a common axis therethrough, which is transverse relative to the housing 41. The lower apertures 41b are similarly oriented. The inner surface of the housing 41 is provided with one or more upper circumferential grooves 41c and one or more lower circumferential grooves 41d. The grooves 41c and 41d are provided for purposes which will be described below.

Upper and lower metallic pins 42 and 43 are provided, similar to the upper and lower pins 22 and 23 previously described. The upper and lower pins 42 and 43 extend through the respective upper and lower apertures 41a and 41b. The ends of the pins 42 and 43 are supported within the respective apertures 41a and 41b by bushings 45, similar to the bushings 25 discussed above. A snap ring 46 is disposed in a circumferential groove formed near each end of both of the pins 42 and 43 to retain the bushings 45 thereon.

As with the damper 25, the lower end of the upper shift lever member 13 is received within the upper end of the housing 41. An aperture 47 is formed through the lower end of the upper shift lever member 13, which is adapted to be aligned with the upper apertures 41a. When so aligned, the upper pin 42 extends through such apertures 47 and 41a to retain the lower end of the upper shift lever member 13 within the housing 41.

Similarly, an aperture 48 is formed through the upper end of the lower shift lever member 11a. The aperture 48 is adapted to be aligned with the lower apertures 41b to permit the lower pin 43 to extend therethrough to retain the upper end of the lower shift lever member 11a within the housing 41. The bushings 45 are sized such that they abut the outer circumferential surfaces of the upper and lower shift lever members 13 and 11a, respectively, when installed as shown. As a result, the upper and lower shift members 13 and 11a, respectively, are reliably secured to the housing 41 so as to prevent them from being withdrawn therefrom without first detaching the snap rings 46 and removing the pins 42 and 43.

Within the housing 41, an upper metallic liner 50 and a lower metallic liner 51 are provided. The upper and lower liners 50 and 51 are generally hollow and cylindrical in shape. However, the ends of both the upper and lower liners 50 and 51 have enlarged outer diameter portions, as shown at 50a and 51a, respectively. The upper liner 50 extends co-axially downwardly from the upper open end of the housing 41, while the lower liner 51 extends co-axially upwardly from the lower end of the housing 41. Thus, the upper enlarged diameter end portion 50a of the upper liner 50 is disposed adjacent to the upper open end of the housing 41. Similarly, the lower enlarged diameter end portion 51a of the lower liner 51 is disposed adjacent to the lower open end of the housing 41.

The upper and lower liners 50 and 51 are located concentrically within and are spaced apart from the housing 41. Thus, annular radially extending spaces are defined between the outer circumferential surfaces of both the upper and lower liners 50 and 51 and the inner circumferential surface of the housing 41. The size of each radial space is somewhat reduced at the upper and lower ends of both the upper and lower liners 50 and 51 because of the enlarged diameter end portions 50a and 51a thereof. The upper and lower liners 50 and 51 do not abut or engage one another, but rather are spaced apart to define a disc-shaped axially extending space therebetween.

As shown in FIG. 3, a noise and vibration dampening material 55 is provided in the axially extending space defined between the liners 50 and 51 and the associated ends of the upper and lower shift lever members 13 and 11a, respectively. This material 55 also fills most of the radially extending spaces defined between the housing 41 and the liners 50 and 51. However, the material 55 does not extend completely to the upper and lower ends of the housing 41. Rather, at least a portion of the axially extending space defined between the upper enlarged diameter end portion 50a of the upper liner 50 and the housing 41 is not filled with the material 55. Similarly, at least a portion of the axially extending space defined between the lower enlarged diameter end portion 51a of the lower liner 51 and the housing 41 is not filled with the material 55.

In this embodiment, the material 55 may be Texin 591-A urethane having a durometer hardness in the eighty-five to ninety-five range, manufactured by Mobay Chemical Company of Cleveland, OH. The material 55 may be provided within the housing 41 by conventional injection molding techniques, wherein the material 55 is forced under pressure through an injection aperture (not shown) formed through the housing 41 when the other components of the damper 40 are assembled and maintained in position as shown. During the injection process, the upper and lower shift lever members 13 and 11a themselves or conventional plugs may be used to prevent the material 55 from entering within the liners 50 and 51.

It has been found desirable to use an adhesive (not shown) to securely bond the urethane material 55 to the inner surface of the housing 41 and to the outer surfaces of the liners 50 and 51. A conventional adhesive, such as Thixon 405 manufactured by Whittaker Corporation of West Alexandria, OH, has been found to function satisfactorily. This adhesive is initially applied in liquid form to the surfaces by any convenient means, such as brushing, then dried and prebaked to obtain optimum adhesion. The circumferential grooves 41c and 41d formed in the inner surface of the housing 41 provided additional surface area thereon for bonding of the urethane material 55 thereto. The grooves 41c and 41d also provided a mechanical stop for preventing axial movement of the material 55 within the housing 41.

When the upper shift lever member 13 is at rest (i.e., not grasped and moved by an operator to shift the transmission 11), the inherent resiliency of the material 55 centers the liners 50 and 51 concentrically within the housing 41. As a result, no direct metal-to-metal contact is between the lower shift lever member 11a and the upper shift lever member 13. In this position, the dampening material 55 greatly reduces the magnitude of noise and vibration which are transmitted from the transmission 11 through the damper 40 into the driver compartment. Since the nylon bushings 45 are somewhat less resilient than the material 55, more noise and vibration is transmitted therethrough. However, the sizes of the bushings 45 are relatively small in comparison to the overall size of the other components of the damper 40, thus preventing the amount of noise and vibration transmitted therethrough from being significant.

When the upper shift lever member 13 is grasped and moved during shifting of the transmission 11, the upper enlarged diameter end portion 50a of the upper liner 50 may directly contact the housing 41. At the same time, the lower enlarged diameter end portion 51a of the lower liner 51 may also directly contact the housing 41. This direct metal-to-metal contact, which would otherwise be undesirable, is acceptable because it only occurs when the handle 12 is grasped and moved during the shifting operation. This is because the noises and vibrations transmitted through the damper 40 because of this direct metal-to-metal contact are effectively dampened by the hand of the person grasping the handle 12. When the handle 12 is released, the liners 50 and 51 are again moved out of direct contact with the housing 41 by the vibration dampening material 55, which thereafter prevents such noise and vibration from being transmitted to the upper shift lever member as described above.

In accordance with the provisions of the patent statutes, the principle and mode of operation of the present invention have been explained and illustrated in its preferred embodiment. However, it must be appreciated that the present invention may be practiced otherwise than as specifically explained and illustrated without departing from its spirit or scope.

What is claimed is:

1. A damper adapted to be connected to an end of a lever member comprising:

a hollow housing having an open end and a pair of apertures formed therethrough;

a hollow liner disposed within said housing having a pair of apertures formed therethrough, said liner adapted to receive therein the end of the lever member extending through said open end of said housing, said liner being spaced apart from said housing to define a radially extending space therebetween;

a pin extending through said pair of housing apertures and said liner apertures;

a pair of bushings formed from a bushing material, said bushings being mounted on the ends of said pin and being disposed within said housing apertures for supporting each end of said pin within said housing apertures; and vibration dampening material disposed in said radially extending space for connecting said liner to said housing, said bushing material being separate from and relatively rigid in comparison to said vibration dampening material.

2. The invention defined in claim 1 further including annular collar means connected about said open end of said housing and including a portion which extends axially along only a portion of an inner surface of said housing adjacent to said open end to reduce said radially extending space thereabout.

3. The invention defined in claim 1 wherein said liner includes an enlarged diameter end portion disposed adjacent to said open end of said housing to reduce said radially extending space thereabout.

4. The invention defined in claim 1 further including a snap ring secured in a groove formed adjacent each end of said pins for retaining each of said bushings thereon.

5. A damper for connecting an end of a first lever member to an end of a second lever member comprising:

a hollow housing having first and second open ends and first and second pairs of aperture formed therethrough;

a first hollow liner disposed within said housing having a pair of aperture formed therethrough, said first liner adapted to receive therein the end of the first lever member extending through said first open end of said housing, said first liner being spaced apart from said housing to define a first radially extending space therebetween;

a first pin extending through said first pair of housing apertures and said first liner apertures;

a first pair of bushings formed from a bushing material, said first bushings being mounted on the ends of said first pin and being disposed within said first housing apertures for supporting each end of said first pin within said first housing apertures;

a second hollow liner disposed within said housing having a pair of apertures formed therethrough, said second liner adapted to receive therein the end of the second lever member extending through said second open end of said housing, said second liner being spaced apart from said housing to define a second radially extending space therebetween, said liners being spaced apart from each other to define an axially extending space therebetween;

a second pin extending through said second pair of housing apertures and said second liner apertures;

a second pair of bushings formed from a bushing material, said second bushings being mounted on the ends of said second pin and being disposed within said second housing aperture for supporting each end of said second pin within said second housing apertures; and vibration dampening material disposed in said radially and axially extending spaces for connecting said liners to said housing, said bushing materials being separate from and relatively rigid in comparison to said vibration dampening material.

6. The invention defined in claim 5 further including annular collar means connected about one of said first and second open ends of said housing and including a portion which extends axially along only a portion of an inner surface of said housing adjacent to said one of said open ends to reduce said radially extending space thereabout.

7. The invention defined in claim 6 where an annular collar means is connected about both of said first and second open ends of said housing.

8. The invention defined in claim 5 wherein said first liner includes an enlarged diameter end portion disposed adjacent to said first open end of said housing to reduce said radially extending space thereabout.

9. The invention defined in claim 8 wherein said second liner includes an enlarged diameter end portion disposed adjacent to said second open end of said housing to reduce said radially extending space thereabout.

10. The invention defined in claim 5 further including a snap ring secured in a groove formed adjacent each end of said pins for retaining each of said bushings thereon.

11. A damper adapted to be connected to an end of a lever member comprising:
- a hollow housing having an open end and a pair of apertures formed therethrough;
- a hollow liner disposed within said housing having a pair of apertures formed therethrough, said liner adapted to receive therein the end of the lever member extending through said open end of said housing, said liner being spaced apart from said housing to define a radially extending space therebetween;
- annular collar means connected about said open end of said housing and including a portion which extends axially along only a portion of an inner surface of said housing adjacent to said open end for reducing said radially extending space;
- a pin extending through said pair of housing apertures and said liner apertures; and
- vibration dampening material disposed in said radially extending space for connecting said liner to said housing.

12. The invention defined in claim 11 further including a bushing for supporting each end of said pin within said aperture.

13. The invention defined in claim 12 further including a snap ring secured in a groove formed adjacent each end of said pin for retaining each of said bushings thereon.

14. A damper for connecting an end of a first lever member to an end of a second lever member comprising:
- a hollow housing having first and second open ends and first and second pairs of apertures formed therethrough;
- a first hollow liner disposed within said housing having a pair of apertures formed therethrough, said first liner adapted to receive therein the end of the first lever member extending through said first open end of said housing, said first liner being spaced apart from said housing to define a first radially extending space therebetween;
- annular collar means connected about said first open end of said housing and including a portion which extends axially along only a portion of an inner surface of said housing adjacent to said first open end for reducing said radially extending space;
- a first pin extending through said first pair of housing apertures and said first liner apertures;
- a second hollow liner disposed within said housing having a pair of apertures formed therethrough, said second liner adapted to receive therein the end of the second lever member extending through said second open end of said housing, said second liner being spaced apart from said housing to define a second radially extending space therebetween, said liners being spaced apart from each other to define an axially extending space therebetween;
- annular collar means connected about said second open end of said housing and including a portion which extends axially along only a portion of an inner surface of said housing adjacent to said second open end for reducing said radially extending space;
- a second pin extending through said second pair of housing apertures and said second liner apertures; and
- vibration dampening material disposed in said radially and axially extending spaces for connecting said liners to said housing.

15. The invention defined in claim 14 further including a bushing for supporting each end of each of said pins within said housing apertures.

16. The invention defined in claim 15 further including a snap ring secured in a groove formed adjacent each end of each of said pins for retaining each of said bushings thereon.

17. A damper for a shift lever assembly adapted to be connected to an end of a lever member comprising:
- a hollow housing having an open end and a pair of apertures formed therethrough;
- a hollow liner disposed within said housing having a pair of apertures formed therethrough, said liner adapted to receive therein the end of the lever member extending through said open end of said housing, said liner being spaced apart from said housing to define a radially extending space therebetween, an enlarged diameter portion being formed on said liner and disposed adjacent to said open end of said housing for reducing said radially extending space;
- a pin extending through said pair of housing apertures and said liner apertures; and
- vibration dampening material disposed in said radially extending space for connecting said liner to said housing.

18. The invention defined in claim 17 further including a bushing for supporting each end of said pin within said housing apertures.

19. The invention defined in claim 18 further including a snap ring secured in a groove formed adjacent each end of said pin for retaining each of said bushings thereon.

20. A damper for a shift lever assembly connecting an end of a first lever member to an end of a second lever member comprising:
- a hollow housing having first and second open ends and first and second pairs of aperture formed therethrough;

a first hollow liner disposed within said housing having a pair of apertures formed therethrough, said first liner adapted to receive therein the end of the first lever member extending through said first open end of said housing, said first liner being spaced apart from said housing to define a first radially extending space therebetween, an enlarged diameter portion being formed on said first liner and disposed adjacent to said first open end of said housing for reducing said radially extending space;

a first pin extending through said first pair of housing apertures and said first liner apertures;

a second hollow liner disposed within said housing having a pair of aperture formed therethrough, said second liner adapted to receive therein the end of the second lever member extending through said second open end of said housing, said second liner being spaced apart from said housing to define a second radially extending space therebetween, an enlarged diameter portion being formed on said second liner and disposed adjacent to said second open end of said housing for reducing said radially extending space, said liners being spaced apart from each other to define an axially extending space therebetween;

a second pin extending through said second pair of housing apertures and said second liner apertures;

vibration dampening material disposed in said radially and axially extending spaces for connecting said liners to said housing.

21. The invention defined in claim 20 further including a bushing or supporting each end of each of said pins within said housing apertures.

22. The invention defined in claim 21 further including a snap ring secured in a groove formed adjacent each end of each of said pins for retaining each of said bushings thereon.

* * * * *

UNITED STATES PATENT AND TRADEMARK OFFICE
CERTIFICATE OF CORRECTION

PATENT NO. : 4,960,009
DATED : October 2, 1990
INVENTOR(S) : Donald C. Schultz, James G. Koedam and William R. Lefevre It is certified that error appears in the above-identified patent and that said Letters Patent is hereby corrected as shown below:

On the title page Item: [75] Inventors: "Donald C. Schultz; James G. Koedam, both of Toledo, Ohio" should be changed to -- Donald C. Schultz and James G. Koedam, both of Toledo, Ohio and William R. Lefevre, of Perrysburg, Ohio --.

Signed and Sealed this

Eleventh Day of February, 1992

Attest:

HARRY F. MANBECK, JR.

*Attesting Officer*     *Commissioner of Patents and Trademarks*